United States Patent [19]

Brewer

[11] Patent Number: 5,362,284
[45] Date of Patent: Nov. 8, 1994

[54] THREE-STAGE TORQUE PROPORTIONING DIFFERENTIAL

[75] Inventor: Mark S. Brewer, North Chili, N.Y.

[73] Assignee: Zexel-Gleason USA, Inc., Rochester, N.Y.

[21] Appl. No.: 944,893

[22] Filed: Sep. 14, 1992

[51] Int. Cl.$^5$ ............................................. F16H 37/08
[52] U.S. Cl. .................................... 475/249; 475/252
[58] Field of Search ............... 475/226, 227, 231, 249, 475/252, 257

[56] References Cited

U.S. PATENT DOCUMENTS

| | | | |
|---|---|---|---|
| 2,786,366 | 3/1957 | Tallakson | 475/249 |
| 3,251,244 | 5/1966 | Nickell | 475/252 X |
| 3,375,736 | 4/1968 | Saari | 475/249 X |
| 4,535,651 | 8/1985 | Chambers | 475/249 X |
| 4,805,487 | 2/1989 | Pedersen . | |
| 4,890,511 | 1/1990 | Pedersen . | |
| 4,926,711 | 5/1990 | Arakawa . | |
| 5,098,356 | 3/1992 | Guidoni et al. | 475/227 |
| 5,108,353 | 4/1992 | Brewer et al. | 475/252 X |
| 5,169,370 | 12/1992 | Dye et al. | 475/226 X |
| 5,232,416 | 8/1993 | Amborn et al. | 475/249 X |

FOREIGN PATENT DOCUMENTS

| | | | |
|---|---|---|---|
| 951431 | 10/1949 | France | 475/249 |
| 1236945 | 6/1960 | France . | |
| 1550680 | 2/1969 | Germany . | |
| 3927071 | 3/1990 | Germany . | |
| 4027422A1 | 3/1992 | Germany . | |
| 654138 | 6/1951 | United Kingdom | 475/249 |

Primary Examiner—Dirk Wright
Assistant Examiner—Khoi O. Ta
Attorney, Agent, or Firm—Eugene Stephens & Associates

[57] ABSTRACT

A torque proportioning differential (10) is modified to vary bias ratio in three distinct stages in response to predetermined levels of drive torque. A pair of side gears (26 and 28) carried within a differential housing (12) generate respective thrust forces (44 and 46) that can be opposed by both high-friction gear mounting surfaces (68 and 70) and low-friction gear mounting surfaces (84 and 86). Outer disc springs (72 and 74) transmit a first portion of the thrust forces (44 and 46) to the low-friction gear mounting surfaces (84 and 86). Inner disc springs (64 and 66) transmit together with the outer disc springs (72 and 74) a second portion of the thrust forces (44 and 46) up to a second magnitude. Either the inner disc springs (64 and 66) or the outer disc springs (72 and 74) transmit the remaining portion of the thrust forces (44 and 46) above the second magnitude.

39 Claims, 8 Drawing Sheets

THREE-STAGE TORQUE PROPORTIONING DIFFERENTIAL

FIELD OF INVENTION

The invention relates to the field of differentials used in automotive drive lines for transmitting drive power from a single input shaft to two output shafts and, more particularly, to such differentials that develop a resistance to relative rotation between the output shafts as a function of drive torque that is transmitted by the differential.

BACKGROUND OF INVENTION

Torque proportioning differentials develop a frictional resistance to relative rotation (i.e., differentiation) between output shafts substantially proportional to the total amount of torque transmitted to the output shafts. The resistance to the relative rotation of the output shafts is reflected as a torque difference between the output shafts. The torque difference varies substantially linearly with the sum of torque of the output shafts as expressed in the following equation:

$$T_d = k\, T_s$$

where "$T_d$" is the torque difference between output shafts, "$T_s$" is the torque sum of the same shafts, and "$k$" is a proportionality constant.

However, this torque proportioning characteristic is more commonly expressed as a "bias ratio", which is a ratio of the respective amounts of torque in the two output shafts. The bias ratio "B" can also be expressed in terms of the torque difference "$T_d$" and torque sum "$T_s$" as follows:

$$B = \frac{T_s + T_d}{T_s - T_d}$$

Torque proportioning differentials generally exhibit a relatively constant bias ratio, which is selected to meet particular traction objectives. For example, a torque proportioning differential with a bias ratio of 3 to 1 can deliver a total amount of drive torque to a pair of drive wheels equal to four times the amount of drive torque exerted by the drive wheel having the least traction.

However, the same distribution of drive torque is required to permit any relative rotation between drive axles. For example, an increased amount of the total drive torque is delivered to the slower rotating drive wheel regardless of traction conditions. This increased amount of torque is equal to the torque difference that opposes relative rotation between drive axles.

Any torque difference "$T_d$" between front or rear drive wheels contributes to a vehicle yaw moment that could influence vehicle lateral stability. While differentiating under power, the torque difference between output shafts required to permit differentiation produces a vehicle understeer moment. However, if the required torque difference cannot be sustained by available traction, differentiation ceases and the remaining torque difference can produce either an understeer or an oversteer moment. Torque differences between front drive wheels can also produce so-called "torque steer" moments that oppose steering efforts.

SUMMARY OF INVENTION

My invention improves upon a prior invention disclosed in U.S. Pat. No. 5,098,356, entitled Multi-Stage Torque Proportioning Differential, in which I am named as co-inventor; and this patent is hereby incorporated by reference for all of its relevant disclosure. The improvement relates to varying bias ratios in three distinct stages in response to predetermined levels of drive torque. Within each stage, resistance to relative rotation between drive axles varies as a function of drive torque. However, different functions are used at each of the three stages to better control the resistance to differentiation at the predetermined levels of the drive torque.

For example, at low levels of drive torque associated with vehicle cruising speeds or with very low overall traction conditions, a low bias ratio may be desirable to minimize torque differences between drive wheels. However, at moderate levels of drive torque required for vehicle longitudinal acceleration, a higher bias ratio may be desirable to make better use of uneven traction (i.e., traction that differs between drive wheels). Nonetheless, at high levels of drive wheels. This would similarly limit differential contributions to yaw or torque steer moments that could adversely affect vehicle handling and stability.

One example of my new differential includes a housing rotatable by drive torque about a common axis of a pair of output shafts and an operative connection between the output shafts for permitting the output shafts to rotate in opposite directions with respect to the housing (i.e., differentiation). A component of the operative connection develops a thrust force that varies in magnitude as a function of the drive torque transmitted to the output shafts. Two faces of the component are inclined to the thrust force direction. Movement of the component in the thrust force direction is opposed by two frictional surfaces that are aligned with the two faces of the component. Separate control members transmit the thrust force between the two faces of the component and the two frictional surfaces for controlling frictional resistance to differentiation.

The first control member transmits a first portion of the thrust force between one of the component faces and one of the friction surfaces up to a first magnitude. Both control members jointly transmit a second portion of the thrust force between the first magnitude and a second higher magnitude. However, only one of the control members transmits a third portion of the thrust force above the second magnitude.

Preferably, the operative connection between output shafts is a planetary gear set having a pair of side gears rotatable with the output shafts and pairs of planet gears that transmit drive power between the side gears. One or more gear components of the planet gear set develops a thrust force that is constrained by a pair of gear mounting surfaces. A pair of resilient members in the form of disc springs communicate the thrust force between respective end faces of the gear component and the gear mounting surfaces.

Initially, only one of the disc springs transmits thrust force between one of the end faces of the gear component and one of the gear mounting surfaces. However, the second disc spring begins to transmit a portion of the thrust force between the other gear end face and the other gear mounting surface at a first predetermined magnitude of the thrust force. At a second predetermined magnitude, one of the gear mounting surfaces forms a stop that prevents further relative movement between the gear component and the gear mounting surfaces. Any additional thrust force is transmitted between the gear end face and gear mounting surface that forms the stop.

Frictional resistance to differentiation is controlled as a varying proportion of the drive torque by selectively engaging the two interfaces between the gearing component and the gear mounting surfaces, each interface exhibiting different frictional characteristics. For example, a small proportion of the drive torque can be converted into frictional resistance to differentiation by engaging only one of the two interfaces (i.e., the lower friction interface) for drive torques up to a first magnitude. Between the first magnitude and a second magnitude of the drive torque, a higher proportion of the drive torque can be converted into frictional resistance to differentiation by engaging both interfaces (i.e., both the higher and lower friction interfaces). Either a higher or a lower portion of the drive torque above the second magnitude can be converted into frictional resistance to differentiation by limiting further engagement to either the higher or lower frictional interface.

Another example of my new differential requires three frictional interfaces but only one control member for producing three-stage torque proportioning. The control member applies an initial force of a first magnitude through both the first and third frictional interfaces. In addition, the control member directs a first portion of an opposing thrust force up to a second magnitude through the first frictional interface and directs a second portion of the thrust force above the second magnitude through the second frictional interface.

As a result, the first and third of the frictional interfaces are engaged at magnitudes of the thrust force less than the first magnitude. However, only the first of the frictional surfaces is engaged at magnitudes of the thrust force between the first and second magnitudes. Above the second magnitude, both the first and second of the frictional surfaces are engaged.

The third frictional interface is preferably arranged as a high friction interface for delivering a predetermined minimum amount of torque to one of a pair of drive wheels independent of the amount of traction available to the other drive wheel. However, the first frictional interface is preferably arranged as a low frictional interface for minimizing torque differences between the same drive wheels at vehicle cruising speeds, and the second frictional interface is preferably arranged as a high friction interface for supporting substantial torque differences between drive wheels during periods of vehicle acceleration.

DRAWINGS

DETAILED DESCRIPTION

Figure 1:
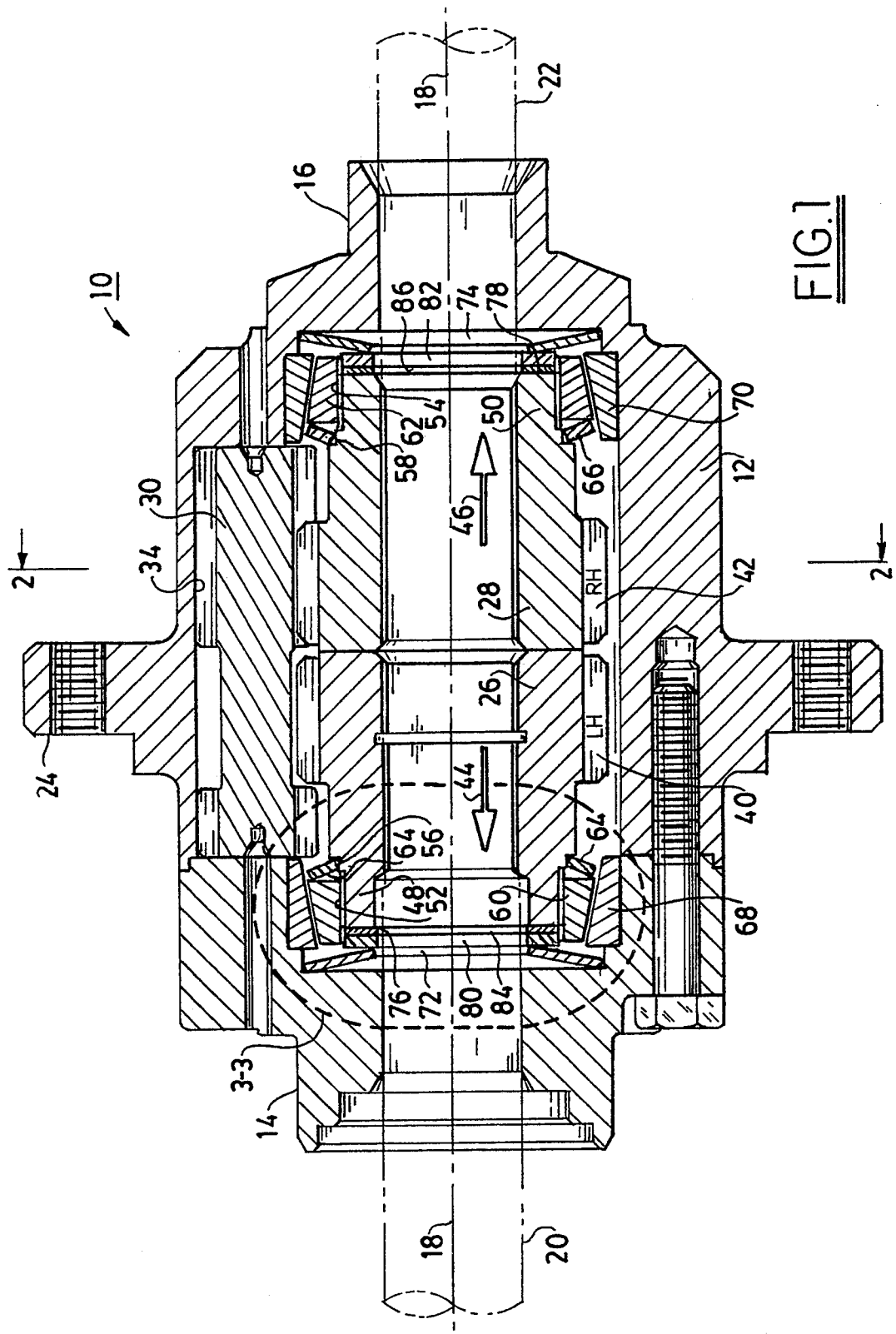
FIG. 1 is a cross-sectional view of a parallel axis gear differential modified to support three operating stage variations in bias ratio.
Figure 2:
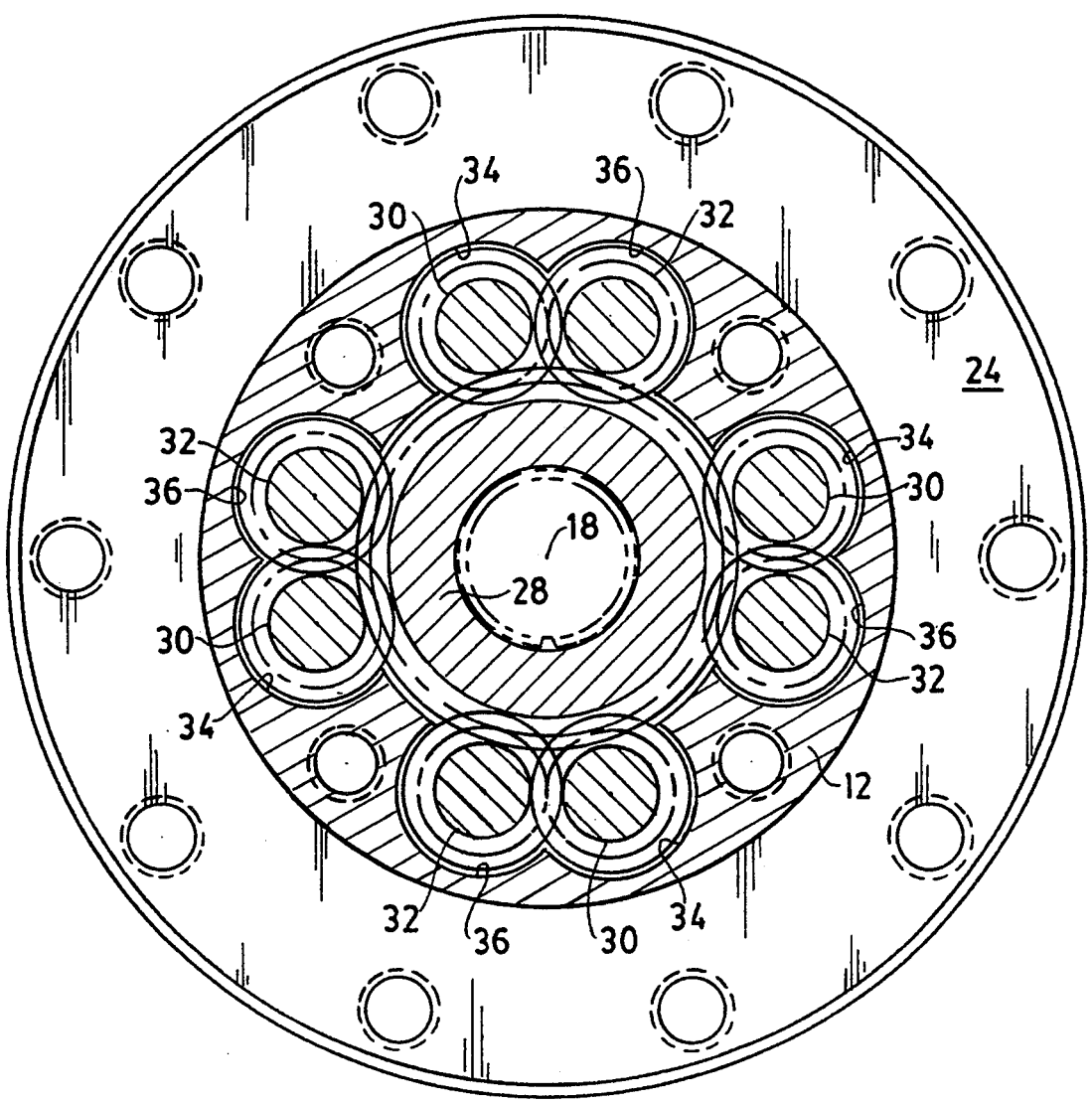
FIG. 2 is a cross-sectional view of the differential of FIG. 1 taken along line 2—2.

One example of my invention is illustrated in FIGS. 1 and 2 as a parallel-axis gear differential 10 that is modified to provide three distinct stages of torque proportioning. A housing 12 of the differential 10 rotates on trunnions 14 and 16 about a common axis 18 of a pair of output shafts 20 and 22. A flange 24 supports a ring gear (not shown) for connecting the housing 10 to an input shaft (also not shown).

A planetary gear assembly carried within the housing 12 includes a pair of side gears 26 and 28 interconnected by four pairs of planet gears 30 and 32. The side gears 26 and 28 are splined to inner ends of the two output shafts 20 and 22 for rotating with the output shafts about the common axis 18. The planet gears 30 and 32 are captured within respective cylindrical pockets 34 and 36 that are formed in the housing 12 in pairs at evenly spaced intervals about the side gears 26 and 28. Each of the depicted planet gears 30 and 32 includes one gear portion for meshing with one of the side gears 26 and 28 and two gear portions for meshing with its paired planet gear.

The side gears 26 and 28 have respective teeth 40 and 42 that are inclined at helix angles in opposite directions with respect to the common axis 18. Forward drive torque transmitted through the planetary gear assembly between the housing 12 and the output shafts 20 and 22 generates thrust forces 44 and 46 that urge the side gears 26 and 28 along the common axis 18 toward opposite ends of the housing. The magnitudes of the thrust forces 44 and 46 are proportional to both the magnitude of the drive torque and the tangent function of the respective side gear helix angles.

Outer ends of the two side gears 26 and 28 are formed with annular projections 48 and 50 that include respective splined portions 52 and 54 and stepped portions 56 and 58. The splined portions 52 and 54 engage mating splined portions of respective conical washers 60 and 62 that function as movable end faces of the side gears. The stepped portions 56 and 58 mount inner disc springs 64 and 66. Movements of the conical washers 60 and 62 along the common axis 18 toward the center of the housing 12 are restrained by the inner disc springs 64 and 66. High-friction conical bushings 68 and 70, which are mounted at opposite ends of the housing 12, form respective gear mounting surfaces that limit movement of the conical washers 60 and 62 along the common axis 18 toward the ends of the housing.

Outer disc springs 72 and 74 are also mounted in opposite ends of the housing for restraining movement of the side gears 26 and 28 along the common axis 18. However, assembled between the outer disc springs 72 and 74 and respective end faces 76 and 78 of the side gears 26 and 28 are conventional washers 80 and 82 and low-friction bushings 84 and 86. Similar to the conical bushings 68 and 70, the low-friction bushings 84 and 86 form gear mounting surfaces at which relative rotation takes place between the respective side gears 26 and 28 and the housing 12. Prior to installing the output shafts 20 and 22, portions of the conical washers 60 and 62 extending beyond the end faces 76 and 78 of the side gears help to capture the conventional washers 80 and 82 and the low-friction bushings 84 and 86 within the housing 12.

Figure 4:
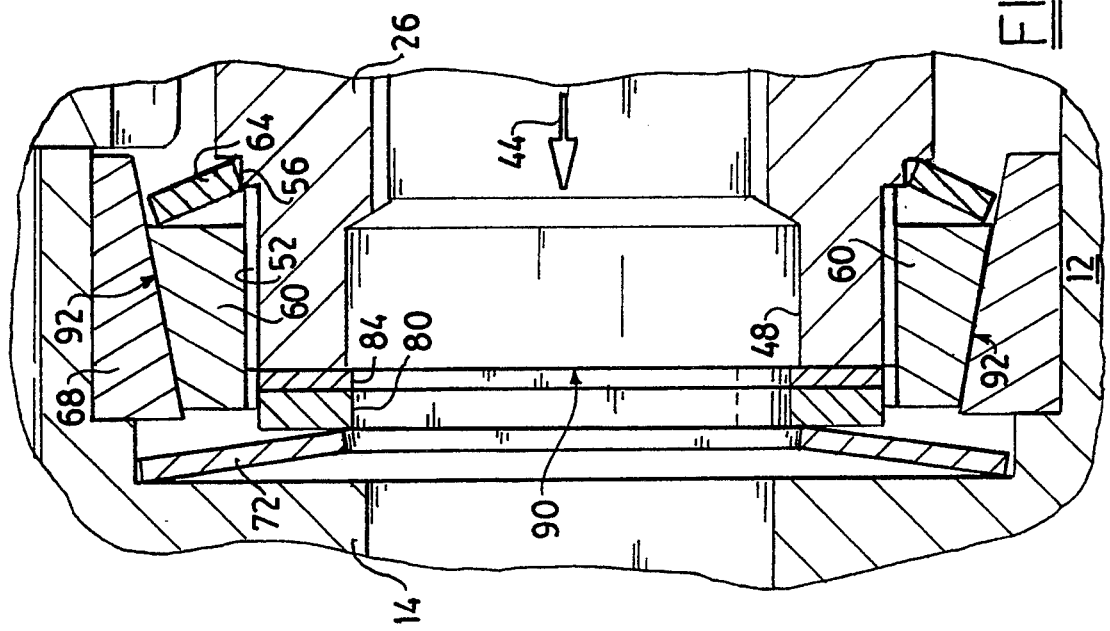
FIG. 4 is a similarly enlarged cut-away cross-sectional view of the differential of FIG. 1 showing relative positions among components at a second operating stage.
Figure 3:
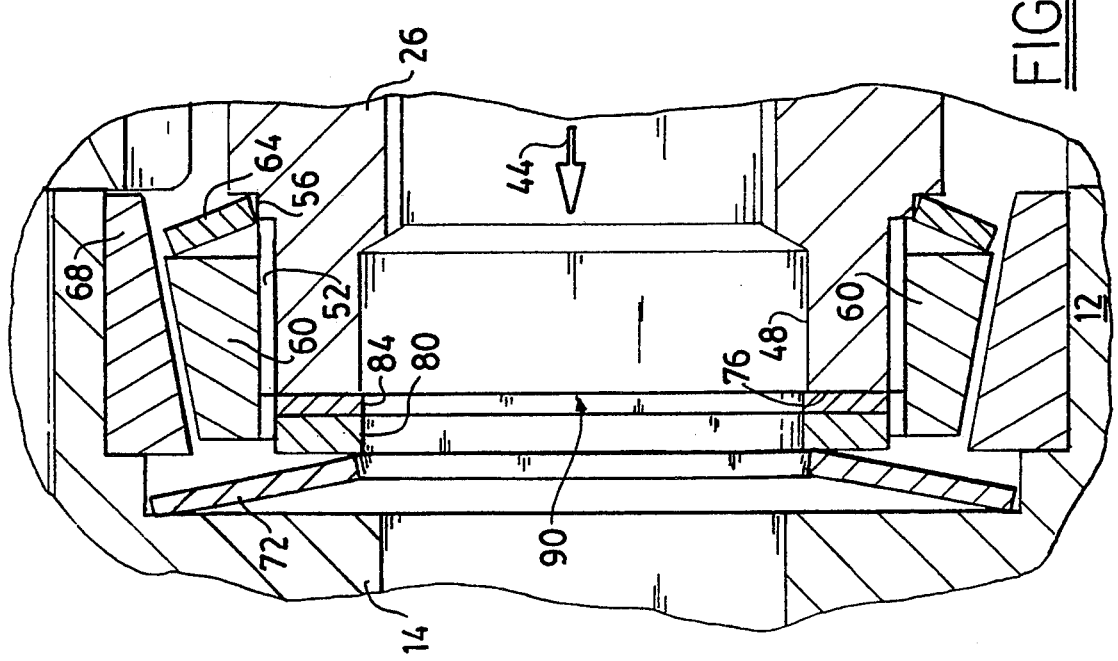
FIG. 3 is an enlarged cut-away cross-sectional view of the differential of FIG. 1 showing relative positions among components at a first operating stage.
Figure 5:
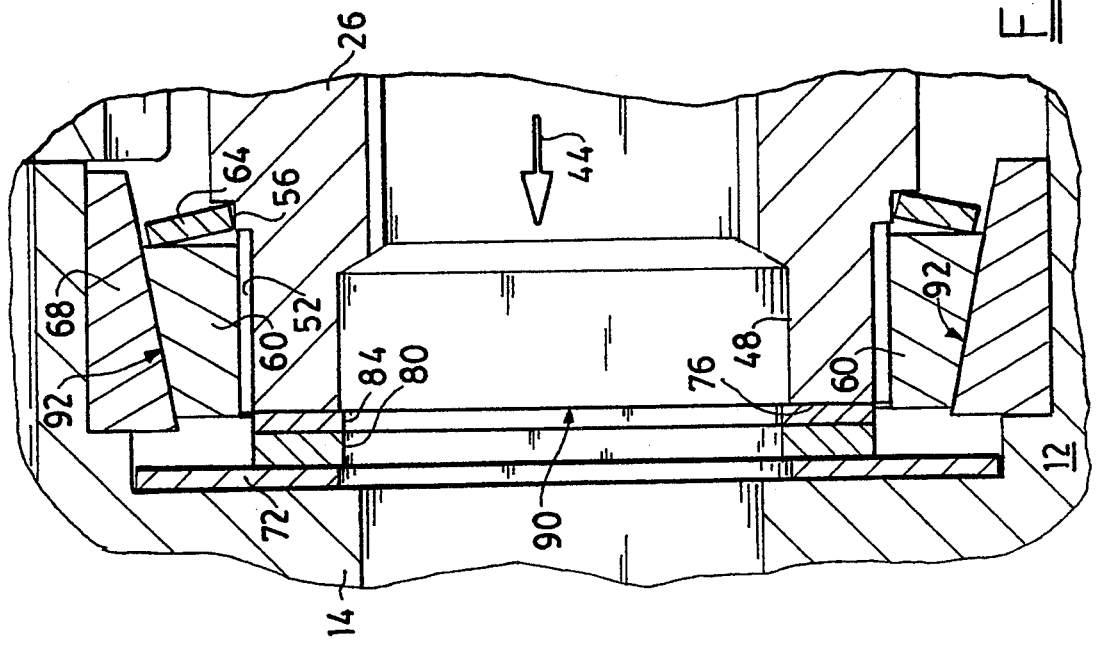
FIG. 5 is a similarly enlarged cut-away cross-sectional view of the differential of FIG. 1 showing relative positions among components at a third operating stage.

The enlarged views of FIGS. 3 through 5 depict different operating positions of the differential components for producing three different torque proportioning characteristics. Although only the components associated with the side gear 26 are shown in each of these figures, it may be understood that the corresponding components associated with the side gear 28 function similarly.

FIG. 3 shows outer disc spring 72 positioned for opposing the entire thrust force 46 up to a first magnitude. The thrust force 44 is communicated from the end face 76 of the side gear 26 to the disc spring 72 through the conventional washer 80 and the low-friction bushing 84. Relative rotation between the side gear 26 and the housing 12 occurs at a planar interface 90 between the end face 76 of the side gear 26 and the low-friction bushing 84. Accordingly, the resistance to relative rotation at the interface 90 is relatively low.

At magnitudes of the thrust force 44 above the first magnitude, the outer disc spring 72 deflects as shown in FIG. 4 by an amount that enables the conical washer 60 to engage the conical bushing 68. The inner disc spring 64 transmits a portion of the thrust force above the first magnitude between the side gear 26 and the conical washer 60. Relative rotation between the side gear 26 and the housing 12 also occurs at a conical interface 92 between the conical washer 60 and the conical bushing 68. The inclination of the conical interface 92 and its coefficient of friction are adjusted to produce a significant resistance to differentiation as a function of the thrust force transmitted by the inner disc spring 64.

Both the inner disc spring 64 and the outer disc spring 72 continue to deflect up to a second magnitude of the thrust force 44. The relative resilience of the two springs 64 and 72 helps to determine the portions of the thrust force transmitted by the planar interface 90 and the conical interface 92. For example, if the inner disc spring 64 is made more resilient (i.e., has a higher spring rate constant) than the outer disc spring 72, then a higher percentage of the additional thrust force between the first magnitude and the second magnitude is transmitted through the conical interface 92.

FIG. 5 shows the outer disc spring 72 collapsed against the housing 12 at a thrust force 44 above the second magnitude. The planar interface 90 forms a stop for limiting further movement of the side gear 26 along the common axis 18. All of the additional thrust force 44 above the second magnitude is transmitted through the planar interface 90. Accordingly, only a small rate of increase in resistance to differentiation accompanies increases in the thrust force above the second magnitude.

Figure 6:
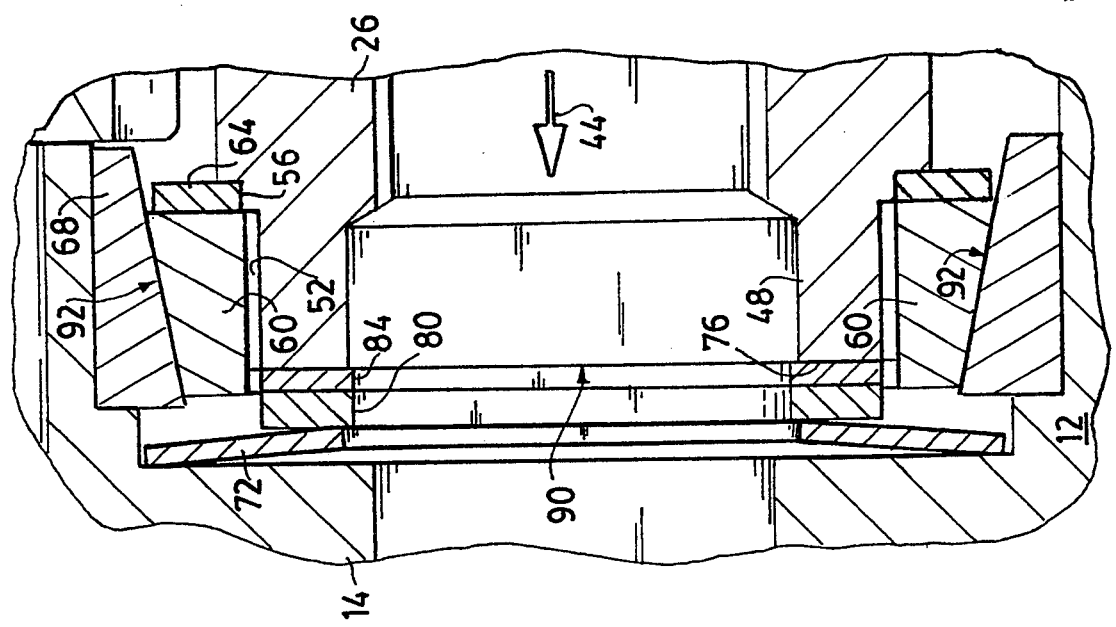
FIG. 6 is an enlarged cut-away cross-sectional view of a differential similar to the differential of FIG. 1 showing relative positions among components at an alternative third operating stage.

An alternative arrangement is shown in FIG. 6 for further increasing resistance to differentiation as a function of thrust forces above the second magnitude. Relative movement between the conical washer 60 and the side gear 26 is limited by engaging the stepped portion 56 of the side gear with the conical washer 60. Since the conical washer forms a fixed part of the side gear, the conical interface 92 between the conical washer 60 and the conical bushing 68 forms a stop for limiting further movement of the side gear along the common axis 18; and all of the additional thrust force 44 above the second magnitude is transmitted through the conical interface. Accordingly, resistance to differentiation increases as a yet higher proportion of the additional thrust force above the second magnitude.

Figure 7:
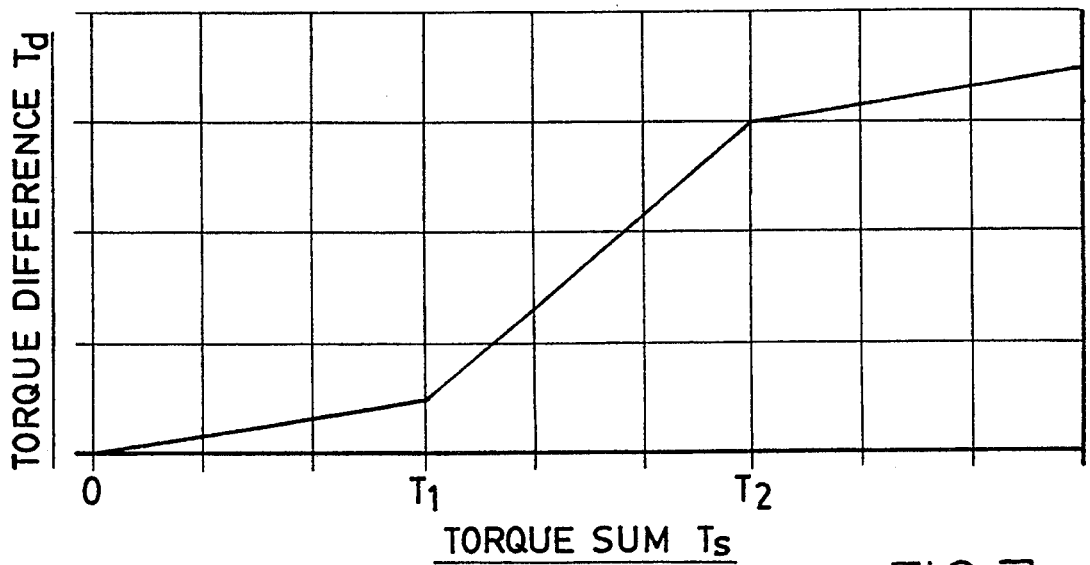
FIG. 7 is a graph plotting torque difference against torque sum exemplifying performance of the three operating stages of FIGS. 3 through 5.
Figure 8:
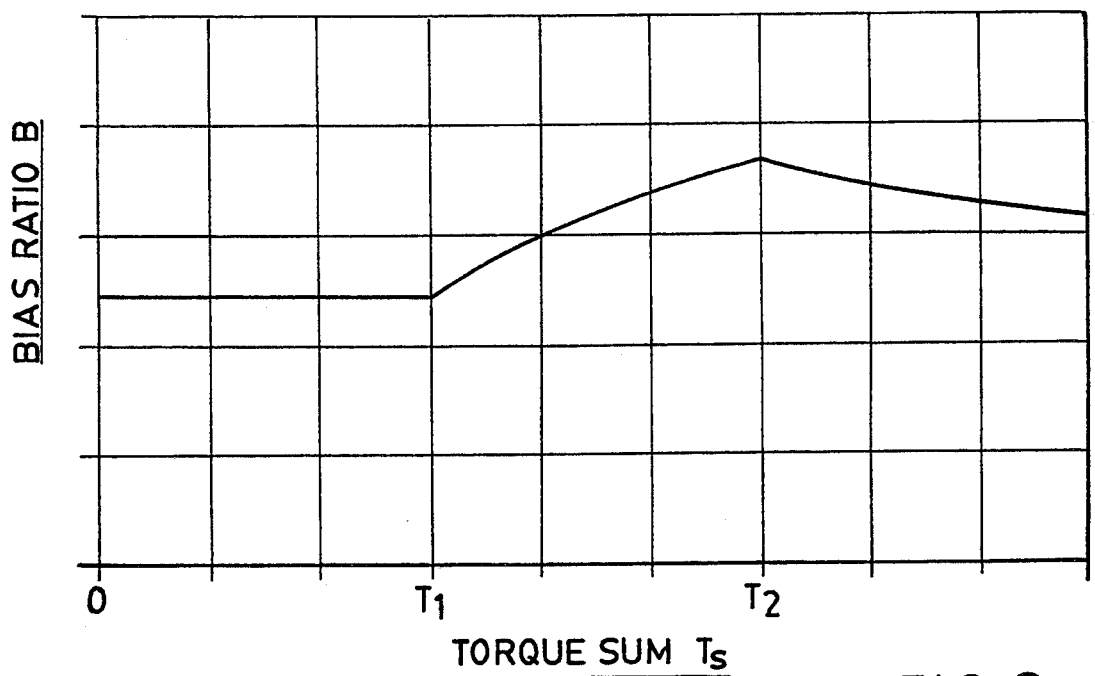
FIG. 8 is a graph plotting bias ratio corresponding to the torque difference of the graph of FIG. 7 over the same domain of torque sum.
Figure 9:
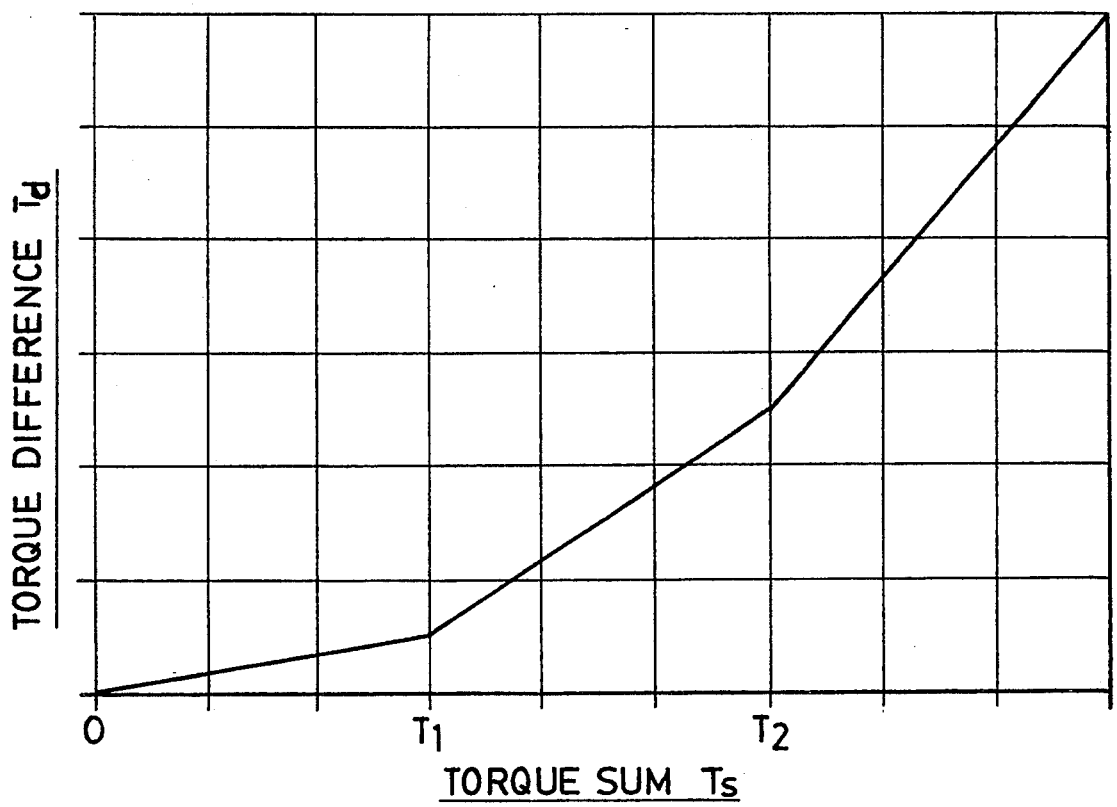
FIG. 9 is a graph plotting torque difference against torque sum exemplifying performance of the three operating stages of FIGS. 3, 4, and 6.
Figure 10:
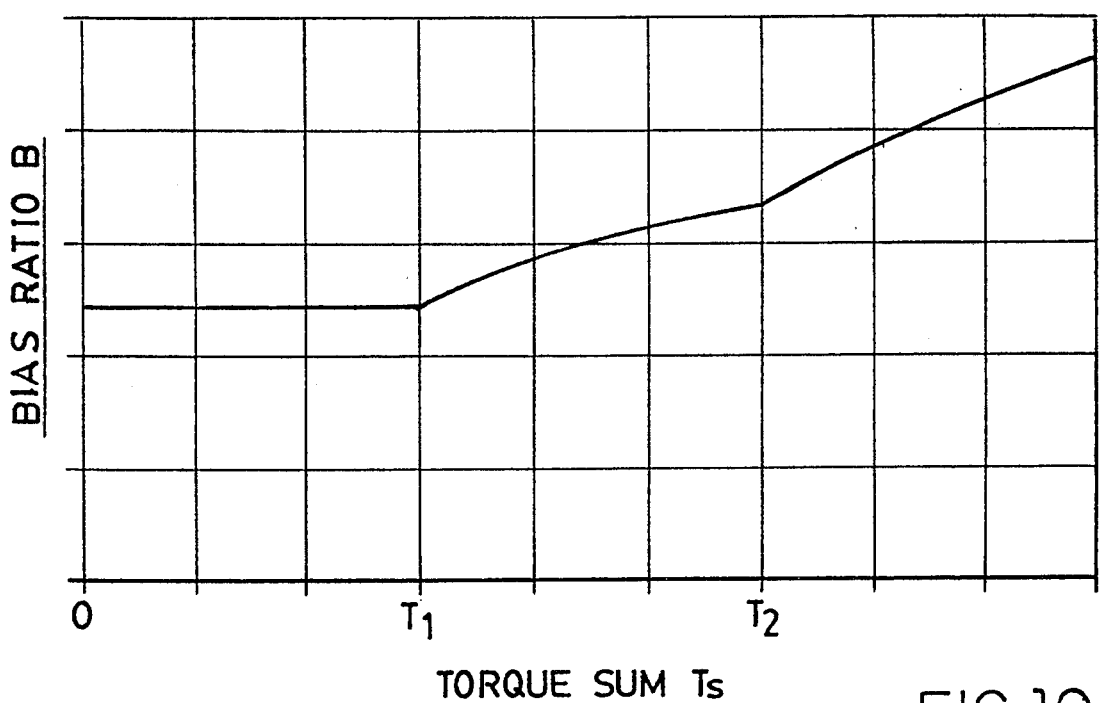
FIG. 10 is a graph plotting bias ratio corresponding to the torque difference of the graph of FIG. 9 over the same domain of torque sum.

The drawing figures, FIGS. 7 through 10, show some of the performance characteristics of my new three-stage torque proportioning differential. FIGS. 7 and 9 plot torque difference "$T_d$" as a function of torque sum "$T_s$". The torque difference "$T_d$" represents an amount of resistance to relative rotation between the output shafts 20 and 22. The torque sum "$T_s$" is the total amount of drive torque transmitted to the two output shafts. FIGS. 8 and 10 plot bias ratios "B" associated with the respective torque difference "$T_d$" values plotted in FIGS. 7 and 9.

Neglecting friction elsewhere in the differential 10, the torque difference "$T_d$" is calculated separately for each of the three stages of performance. For example, for torque sums "$T_s$" less than or equal to a first magnitude "$T_1$", the torque difference "$T_d$" is expressed as follows:

$$T_d = T_s k_1$$

where "$k_1$" is a first constant representing the frictional characteristics contributed by the engagement of the planar interface 90 as shown in FIG. 3. For example, the friction constant "$k_1$" includes the coefficient of friction of the planar interface 90 as well as the effective radius at which the friction is applied against the end face 76 of the side gear.

The expression for torque difference "$T_d$" associated with torque sums "$T_s$" greater than the first magnitude "$T_1$" but less than or equal to a second magnitude "$T_2$" is as follows:

$$T_d = T_1 k_1 + (T_s - T_1) k_2$$

where "$k_2$" is a second constant representing the frictional characteristics contributed by the concurrent engagements of the planar interface 90 and the conical interface 92 as shown in FIG. 4. The friction constant "$k_2$" also incorporates the relative resilience of the two disc springs 64 and 72 and the inclination of the conical interface 92.

Finally, torque difference "$T_d$" is calculated for torque sums "$T_s$" greater than the second magnitude "$T_2$" as follows:

$$T_d = T_1 k_1 + (T_2 - T_1)k_2 + (T_s - T_2)k_3$$

where "$k_3$" is a constant representing the frictional characteristics contributed by either the planar interface 90 as shown in FIG. 5 or the conical interface 92 as shown in FIG. 6.

The plots of FIGS. 7 and 9 are distinguished by different values of the constant "$k_3$". In FIG. 7, the constant "$k_3$" is equal to the constant "$k_1$" because both constants represent the frictional characteristics of the planar interface 90. However, the constant "$k_3$" depicted in the plot of FIG. 9 represents the frictional characteristics of the conical interface 92.

The bias ratios plotted in FIGS. 8 and 10 are constant for torque sums "$T_s$" up to the first magnitude "$T_1$". Preferably, the bias ratios within this first stage are as low as possible to limit torque differences between output shafts at vehicle cruising speeds and very low overall traction conditions. At vehicle cruising speeds, limited traction may be best used to maintain vehicle stability. Also, the ability to divide torque in unequal amounts between drive wheels cannot support increased drive torque when low traction is available to both drive wheels.

However, the bias ratios of both plots significantly increase for magnitudes of drive torque between the first magnitude "$T_1$" and the second magnitude "$T_2$". The higher drive torque magnitudes of the second stage are associated with ordinary vehicle accelerations where the delivery of desired amounts of drive torque is most important. The higher bias ratios permit better use of uneven amounts of traction available to the drive wheels for increasing vehicle speed.

The bias ratio plotted in FIG. 8 for drive torques above the second magnitude "$T_2$" decreases along a path that approaches the bias ratio below the first magnitude "$T_1$". The decreasing bias ratio helps to limit the maximum torque difference between drive axles. Accordingly, vehicle yaw moments and torque steer moments, which are directly affected by the torque difference between drive axles, are similarly limited. However, the torque difference supported within the third stage is not less than the torque difference supported within the second stage to accommodate significant traction differences between drive wheels.

In contrast, the bias ratio plotted in FIG. 10 for the third stage approaches a higher value than the bias ratio plotted for the second stage. The increased bias ratio at high values of the drive torque above the second magnitude "$T_2$" may be desirable in vehicles equipped for pulling trailers or for hauling heavy loads. Additional drive torque is needed for accelerating these vehicles, and the higher bias ratios of the third stage allow for maximum use of traction within the highest range of drive torques.

Figure 11:
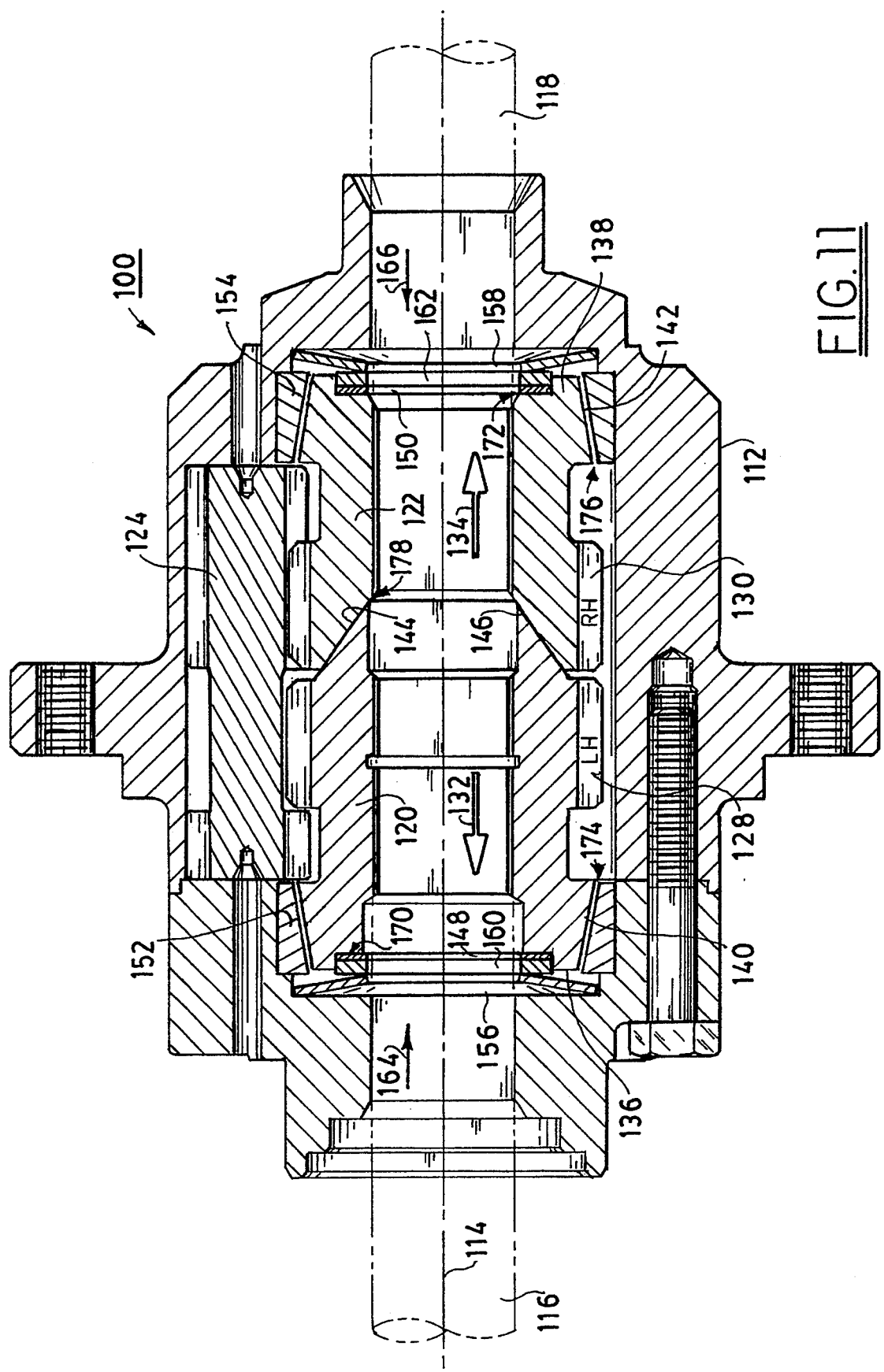
FIG. 11 is a cross-sectional view of a similar parallel axis gear differential modified by a different approach to support three operating stage variations in bias ratio.

Another approach for producing three-stage torque proportioning is exemplified by parallel-axis gear differential 100 shown in FIG. 11. Similar to the preceding embodiment, the differential 100 includes a housing 112 that is rotatable about a common axis 114 of a pair of output shafts 116 and 118. A planetary gear assembly, including a pair of side gears 120 and 122 and two or more pairs of planet gears 124, interconnects the two output shafts 116 and 118 for opposite directions of relative rotation.

The side gears 120 and 122 have respective teeth 128 and 130 that are inclined in opposite directions with respect to the common axis 114. Thrust forces 132 and 134 are generated by the respective side gear teeth 128 and 130 in proportion to the amount of drive torque transmitted between the housing 112 and the output shafts 116 and 118.

The side gears 120 and 122 also include outer end faces 136 and 138, outer conical faces 140 and 142, and inner conical faces 144 and 146. The outer end faces 136 and 138 form first frictional interfaces 170 and 172 with low-friction bushings 148 and 158. The outer conical faces 140 and 142 form second frictional interfaces 174 and 176 with mating conical bushings 152 and 154. The inner conical faces 144 and 146 form a third frictional interface 178 with each other.

Disc springs 156 and 158, acting through conventional steel washers 160 and 162, apply spring forces 164 and 166 that urge the first frictional interfaces 170 and 172 and the third frictional interface 178 into engagement. However, the spring forces 164 and 166 are opposed by the thrust forces 132 and 134 generated by the respective side gears. In addition, the disc springs 156 and 158 are sized with respect to a spacing between the conical bushings 152 and 154 and the outer conical faces 140 and 142 to permit the side gears 120 and 122 to move out of engagement with the third frictional interface 178 before moving into engagement with the second frictional interfaces 174 and 176.

Initially, the disc springs 156 and 158 apply the forces 164 and 166 against the first and third interfaces. However, the force applied against the third interface is diminished by the thrust forces 132 and 134. For thrust forces less than or equal to the spring forces, the torque difference "$T_d$" developed between output shafts 116 and 118 by the three frictional interfaces is expressed in equation form below:

$$T_d = T_1 k_1 + (T_s - T_1)k_3$$

where "$T_1$" is a first magnitude of the drive torque sum "$T_s$" required to generate thrust forces 132 and 134 equal to the spring forces 164 and 166, and "$k_1$" and "$k_3$" are constants representing the respective frictional characteristics of the first frictional interfaces 170 and 172 and the third frictional interface 178.

However, for torque sums "$T_s$" between the first magnitude "$T_1$" and a second magnitude "$T_2$", the expression for torque difference "$T_d$" is simplified as follows:

$$T_d = T_s k_1$$

The second magnitude "$T_2$" corresponds to the amount of drive torque required to generate thrust forces 132 and 134 of sufficient magnitude to engage the second frictional interfaces 174 and 176. Torque sums "$T_s$" above the second magnitude "$T_2$" produce a torque difference "$T_d$" that can be calculated as follows:

$$T_d = T_2 k_1 + (T_s - T_2)k_2$$

Figure 12:
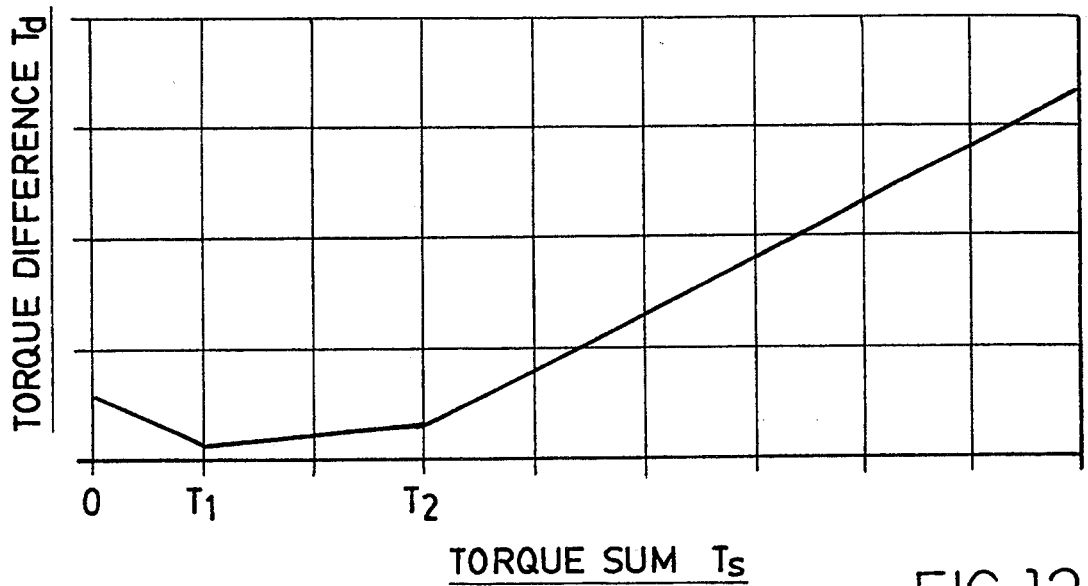
FIG. 12 is a graph plotting torque difference against torque sum exemplifying performance of the three operating stages of the differential illustrated by FIG. 11.

FIG. 12 plots torque difference "$T_d$" throughout three distinct ranges of torque sum "$T_s$" for the differential 100. In particular, the torque difference "$T_d$" diminishes throughout the first range of torque sums "$T_s$" up to the first magnitude "$T_1$". This reflects the progressive disengagement of the third frictional interface 178. The torque difference "$T_d$" throughout the second range of torque sums "$T_s$" between magnitudes "T₁" and "T₂" reflects the engagement of only the first frictional interfaces 170 and 172. However, the increasing slope of torque difference "$T_d$" within the remaining third range of torque sums "$T_s$" reflects the engagement of the second frictional interfaces 174 and 176 by magnitudes of the torque sum above the second magnitude "T₂".

Figure 13:
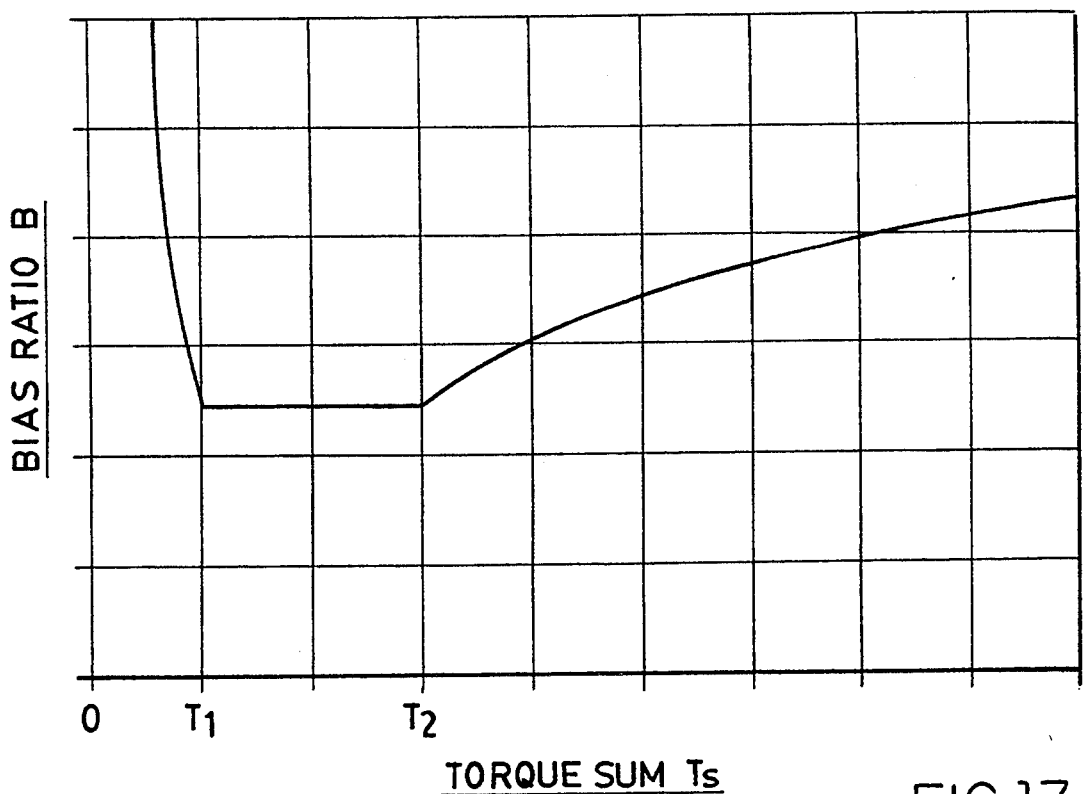
FIG. 13 is a graph plotting bias ratio corresponding to the torque difference of the graph of FIG. 12 over the same domain of torque sum.

The corresponding bias ratios "B" plotted in FIG. 13 approach infinity at reduced torque sums less than "T₁". At zero torque sum "$T_s$", some torque difference is required to permit differential rotation between the output shafts 116 and 118. This provides for delivering a predetermined amount of torque to one of the output shafts even though the other output shaft has no traction. The third frictional interface is preferably a high friction interface to reduce the magnitude of the spring forces 164 and 166 required to produce the initial torque difference or "preload torque".

However, the first frictional interfaces 170 and 172 preferably exhibit lower frictional characteristics to maintain lower bias ratios between magnitudes "T₁" and "T₂" of the drive torque. Above the magnitude "T₂", the bias ratios are allowed to increase by transmitting an increasing portion of the thrust forces 132 and 134 through higher friction second frictional interfaces 174 and 176.

Although my invention has been exemplified by parallel-axis gear differentials, similar modifications could be made to other types of torque proportioning differentials including bevel gear or worm gear differentials. In addition, the thrust forces generated by side gears could also be generated by other gears within the differential, as well as by other components such as cams and couplings.

I claim:

1. A differential for transmitting drive torque from a single input shaft to a pair of relatively rotatable output shafts comprising:
   a housing rotatable by the drive torque about a common axis of the pair of output shafts;
   an operative connection for permitting the output shafts to rotate in opposite directions with respect to said housing;
   a component of said operative connection mounted within said housing for developing a thrust force that varies in magnitude as a function of the drive torque transmitted to the output shafts;
   first and second faces of said component oriented at respective inclines to a direction of the thrust force developed by said component;
   first and second frictional surfaces for opposing respective movements of said first and second faces in the thrust force direction;
   first and second control members for transmitting the thrust force between said first and second faces of the component and said first and second frictional surfaces;
   said first control member being arranged for transmitting a first portion of the thrust force between said first face of the component and said first frictional surface up to a first magnitude;
   said first and second control members being arranged for jointly transmitting a second portion of the thrust force between the first magnitude and a second magnitude; and
   one of said first and second control members being arranged for transmitting a third portion of the thrust force above the second magnitude.

2. The differential of claim 1 in which a minimum thrust force required to transmit any portion of the thrust force between said second face and said second frictional surface is above the first magnitude.

3. The differential of claim 2 in which a minimum magnitude required to effectively engage one of said first and second faces with one of said first and second frictional surfaces for preventing further movement of said first and second faces in the thrust force direction is above the second magnitude.

4. The differential of claim 3 in which said first control member is arranged for transmitting the third portion of the thrust force above the second magnitude.

5. The differential of claim 4 in which said first face effectively engages said first frictional surface for preventing further movement between said component and said housing.

6. The differential of claim 3 in which said second control member is arranged for transmitting the third portion of the thrust force above the second magnitude.

7. The differential of claim 6 in which said second face effectively engages said second frictional surface for preventing further movement between said component and said housing.

8. The differential of claim 1 in which said component is rotatable about an axis that extends in the thrust force direction for transmitting relative rotation between the output shafts, and said first and second frictional surfaces exhibit respective first and second frictional coefficients opposed to rotation of said component.

9. The differential of claim 8 in which:
   a first frictional torque is applied against said component as a function of said first coefficient of friction and the first portion of the thrust force,
   a second frictional torque is applied against said component as a function of said first and second coefficient of frictions and the second portion of the thrust force, and
   a third frictional torque is applied against said component as a function of one of said first and second coefficient of frictions and the third portion of the thrust force.

10. The differential of claim 9 in which said first, second, and third frictional torques provide for contributing to a torque difference "$T_d$" between output shafts, and said operative connection provides for dividing a torque sum "$T_s$" between output shafts in accordance with the following bias ratio "B":

$$B = \frac{T_s + T_d}{T_s - T_d}.$$

11. The differential of claim 10 in which the bias ratios associated with thrust forces less than the first magnitude are less than the bias ratios associated with thrust forces between the first and second magnitudes.

12. The differential of claim 11 in which the third frictional torque is applied against said component as a function of said first coefficient of friction and the third portion of the thrust force.

13. The differential of claim 12 in which the bias ratios associated with thrust forces between the first and second magnitudes are greater than the bias ratios associated with thrust forces above the second magnitude.

14. The differential of claim 11 in which the third frictional torque is applied against said component as a function of said second coefficient of friction and the third portion of the thrust force.

15. The differential of claim 14 in which the bias ratios associated with thrust forces between the first and second magnitudes are less than the bias ratios associated with thrust forces above the second magnitude.

16. A multi-stage torque proportioning differential for distributing drive torque between a pair of output shafts comprising:
   a housing rotatable by the drive torque about a common axis of the pair of output shafts;
   a pair of side gears carried within said housing and arranged for rotation with the output shafts about the common axis;
   a pair of planetary gears carried within said housing and operatively connecting the side gears for opposite directions of rotation with respect to said housing;
   one of said gears including gear teeth inclined to said common axis for generating a thrust force along said common axis proportional to the drive torque distributed between the output shafts;
   first and second end faces of said one gear movable with respect to said housing in a direction of the thrust force developed by said component;
   first and second gear mounting surfaces for opposing respective movements of said first and second end faces with respect to said housing;
   a first interface between said first end face of said one gear and said first gear mounting surface;
   a second interface between said second end face of said one gear and said second gear mounting surface;
   a first resilient member for transmitting the thrust force through said first interface;
   a second resilient member for transmitting the thrust force through said second interface; and
   said first and second interfaces being engageable by said first and second resilient members for supporting a torque difference "$T_d$" between the output shafts in accordance with the following relationship:

$$T_d = T_1 k_1 + (T_2 - T_1) k_2 + (T_s - T_2) k_3$$

where "$T_1$" is a first magnitude of the drive torque, "$k_1$" is a constant representing frictional characteristics of said first interface, "$T_2$" is a second magnitude of the drive torque higher than said first magnitude "$T_1$", "$k_2$" is a constant representing the combined frictional characteristics of said first and second interfaces, "$T_s$" is a third magnitude of the drive torque equal to the sum of drive torques transmitted to the output shafts, and "$k_3$" is a constant representing frictional characteristics of one of said first and second interfaces.

17. The differential of claim 16 in which said constant "$k_2$" is larger than said constant "$k_1$".

18. The differential of claim 17 in which said constant "$k_3$" is equal to said constant "$k_1$".

19. The differential of claim 18 in which said first interface forms a stop for limiting movement of said one gear in the thrust force direction at drive torque magnitudes above the second magnitude "$T_2$".

20. The differential of claim 17 in which said constant "$k_3$" is larger than said constant "$k_2$".

21. The differential of claim 20 in which said second interface forms a stop for limiting movement of said one gear in the thrust force direction at drive torque magnitudes above the second magnitude "$T_2$".

22. The differential of claim 16 in which said second end face is movable with respect to said one gear along the common axis.

23. The differential of claim 22 in which said second resilient member resists the movement of said second end face with respect to said one gear.

24. The differential of claim 23 in which said second end face is a washer that is fixed against rotation with respect to said one gear.

25. A differential for transmitting drive torque from a single input shaft to a pair of relatively rotatable output shafts comprising:
   a housing rotatable by the drive torque about a common axis of the pair of output shafts;
   an operative connection for permitting the output shafts to rotate in opposite directions with respect to said housing;
   a component of said operative connection mounted within said housing for developing a thrust force that varies in magnitude as a function of the drive torque transmitted to the output shafts;
   first, second, and third faces of said component oriented at respective inclines to a direction of the thrust force;
   first and second frictional surfaces for opposing respective movements of said first and second faces in the thrust force direction;
   a third frictional surface for opposing movement of said third face in a direction opposite to the thrust force direction;
   a control member for applying an initial force of a first magnitude between said first and third faces of the component and said first and third frictional surfaces; and
   said control member being arranged for directing a first portion of the thrust force between said first face of the component and said first frictional surface up to a second magnitude and for directing a second portion of the thrust force between the second face of the component and said second frictional surface above the second magnitude.

26. The differential of claim 25 in which the initial force applied by the control member is opposed by the thrust force.

27. The differential of claim 26 in which the second magnitude is larger than the first magnitude.

28. The differential of claim 27 in which only said first and third of the frictional surfaces are engaged by respective faces of the component for magnitudes of the thrust force less than the first magnitude.

29. The differential of claim 28 in which only said first of the frictional surfaces is engaged by the respective faces of the component for magnitudes of the thrust force between said first and second magnitudes.

30. The differential of claim 29 in which only said first and second of the frictional surfaces are engaged by the respective faces of the component for magnitudes of the thrust force above the second magnitude.

31. The differential of claim 27 in which said first and third frictional surfaces provide for supporting a torque difference "$T_d$" between the output shafts for magnitudes of the thrust force below the first magnitude in accordance with the following relationship:

$$T_d = T_1 k_1 + (T_1 - T_s) k_3$$

where "$T_1$" is an amount of drive torque required to generate a thrust force equal to the first magnitude, "$T_s$" is a sum of the drive torques transmitted to the output shafts, "$k_1$" is a constant representing frictional characteristics between said first face of the component and said first frictional surface, and "$k_3$" is a constant representing frictional characteristics between said third face of the component and said third frictional surface.

32. The differential of claim 31 in which said first frictional surface provides for supporting a torque difference "$T_d$" between the output shafts for magnitudes of the thrust force between the first and second magnitudes in accordance with the following relationship:

$$T_d = T_s k_1.$$

33. The differential of claim 32 in which said first and second frictional surfaces provide for supporting a torque difference "$T_d$" between the output shafts for magnitudes of the thrust force above the second magnitude in accordance with the following relationship:

$$T_d = T_2 k_1 + (T_s - T_2) k_2$$

where "$T_2$" is an amount of drive torque required to generate a thrust force equal to the second magnitude, and "$k_2$" is a constant representing frictional characteristics between said second face of the component and said second frictional surface.

34. The differential of claim 33 in which said constant "$k_2$" is larger than said constant "$k_1$".

35. The differential of claim 25 in which said operative connection includes a pair of side gears carried within said housing for rotation with the output shafts about the common axis and a pair of planetary gears carried within said housing operatively connecting said side gears for opposite directions of rotation with respect to said housing.

36. The differential of claim 35 in which said side gears include inner and outer end faces, said component is one of said side gears, and said third face is said inner end face of said one side gear.

37. The differential of claim 36 in which said third frictional surface is said inner end face of the other of said side gears.

38. The differential of claim 37 in which said first frictional surface is said outer end face of said one side gear.

39. The differential of claim 38 in which said one side gear also includes an outer conical face and said second face is said outer conical face.

* * * * *